United States Patent [19]

Sackmann et al.

[11] Patent Number: 4,481,319

[45] Date of Patent: Nov. 6, 1984

[54] LOW-FOAM SURFACE SIZING AGENTS FOR PAPER WHICH CONTAIN COPOLYMERIC MALEIC ANHYDRIDE SEMI-AMIDES

[75] Inventors: Günter Sackmann; Günter Kolb, both of Leverkusen; Joachim Probst, Cologne; Friedhelm Müller, Odenthal; Heinz Bäumgen, Leverkusen, all of Fed. Rep. of Germany

[73] Assignee: Bayer Aktiengesellschaft, Leverkusen-Bayerwerk, Fed. Rep. of Germany

[21] Appl. No.: 410,906

[22] Filed: Aug. 24, 1982

Related U.S. Application Data

[63] Continuation of Ser. No. 227,950, Jan. 23, 1981, abandoned, which is a continuation of Ser. No. 075,519, Sep. 13, 1979, abandoned.

[30] Foreign Application Priority Data

Sep. 19, 1978 [DE] Fed. Rep. of Germany ....... 2840650
Jul. 18, 1979 [DE] Fed. Rep. of Germany ...... 2928984

[51] Int. Cl.³ ........................... C08K 5/21; C08K 5/05
[52] U.S. Cl. ................................ 524/213; 162/164.6; 524/215; 524/216; 524/379; 524/385; 524/389; 525/379

[58] Field of Search ............... 524/211, 213, 215, 216, 524/379, 385, 389, 549

[56] References Cited

U.S. PATENT DOCUMENTS

| | | | |
|---|---|---|---|
| 3,398,092 | 8/1968 | Fields | 526/272 |
| 4,048,422 | 9/1977 | Sackmann | 526/272 |
| 4,064,296 | 12/1977 | Bornstein | 428/35 |
| 4,075,028 | 2/1978 | Amosov | 106/186 |
| 4,151,336 | 4/1979 | Sackmann | 526/272 |
| 4,152,312 | 5/1979 | Sackmann | 524/549 |
| 4,188,443 | 2/1980 | Mueller | 428/216 |
| 4,194,039 | 3/1980 | Mueller | 428/213 |
| 4,261,473 | 4/1981 | Yamada | 215/1 C |

*Primary Examiner*—Christopher A. Henderson
*Attorney, Agent, or Firm*—Connolly and Hutz

[57] ABSTRACT

Low-foam surface sizing agents for paper in the form of aqueous or aqueous-alcoholic alkali metal, amine or ammonium salt solutions of copolymers containing carboxylic acid semi-amide groups obtainable by reacting copolymers of maleic acid anhydride and diisobutylene and/or terpolymers of maleic acid anhydride, diisobutylene and a vinyl monomer copolymerizing with maleic acid anhydride, with from 5 to 50 mole percent, based on maleic acid anhydride groups, of a primary aliphatic or aromatic monoamine. The solutions may optionally contain urea or derivatives of urea.

2 Claims, No Drawings

LOW-FOAM SURFACE SIZING AGENTS FOR PAPER WHICH CONTAIN COPOLYMERIC MALEIC ANHYDRIDE SEMI-AMIDES

CROSS REFERENCE TO RELATED APPLICATIONS

This application is a continuation of application Ser. No. 227,950 filed Jan. 23, 1981, now abandoned, which in turn is a continuation of Ser. No. 075,519 filed Sept. 13, 1979, now abandoned.

BACKGROUND OF THE INVENTION

This invention relates to anionic surface sizing agents for paper based on maleic acid anhydride/diisobutylene copolymers which have a minimal tendency towards foaming under normal processing conditions coupled with a wide scope of application depending on the papers used. German Offenlegungsschrift Nos. 2,361,544 and 2,501,123 describe the production and use of surface sizing agents for paper having excellent properties. The sizing agents in question are aqueous or aqueous-alcoholic alkali metal, amine or ammonium salt solutions of substantially equimolar copolymers, produced in solution or suspension, of maleic acid anhydride and diisobutylene of which from 10 to 100 mole percent of the anhydride groups may be esterified with linear or branched aliphatic monohydricalcohols containing from 1 to 20 carbon atoms or with cycloaliphatic monohydricalcohols containing 5 or 6 carbon atoms to form the corresponding semi-esters. It is also known (cf. German Offenlegungsschrift No. 2,701,760) that, in the solution or suspension copolymerisation of maleic acid anhydride and diisobutylene, a monomer corresponding to the following general formula:

wherein

R represents —H, —CH$_3$, —C$_2$H$_5$, —OR$_2$, —O—COCH$_3$,

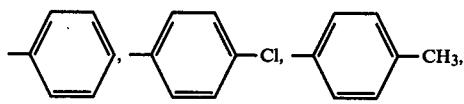

—CH$_2$OH or —CH$_2$—O—COCH$_3$;

R$_1$ represents —H, or —CH$_3$; and

R$_2$ represents a linear or branched alkyl group containing from 1 to 4 carbon atoms;

or mixtures of these monomers with one another may be added to the polymerisation mixture shortly before or after completion of copolymerisation in quantities of from 1 to 12 mole percent, based on the maleic acid anhydride used, excellent anionic surface sizing agents also being obtainable in this way providing the aqueous or aqueous-alcoholic alkali metal, amine or ammonium salt solutions are prepared therefrom. From 10 to 100 mole percent of the anhydride groups of these substantially equimolar copolymers may also be esterified to form the corresponding semi-esters by reaction with linear or branched aliphatic monohydricalcohols containing from 1 to 20 carbon atoms or with cycloaliphatic monohydricalcohols containing 5 or 6 carbon atoms.

Although all the surface sizing agents for paper produced by the above-mentioned process show excellent sizing properties on unsized and pre-sized papers, they are nevertheless attended by certain disadvantages in practical application, for example the foaming which these products undergo under certain practical conditions. foaming occurs above all when the sizing liquid, which in addition, to the sizing agent may also contain up to 8%, by weight, of starch, is prepared using hard water. In addition, the sizing liquid also shows an increased tendency towards foaming when the construction of the particular size press used promotes the entrainment of air bubbles into the sizing liquid. This may be caused, for example, by an excessive drop during recycling from the size press, by the use of rotary pumps instead of reciprocating pumps for transporting the sizing liquid or even by an unfavourable design of the stirrer used in the working vessel. In addition, the type of starch used in the sizing liquid also has a significant bearing upon the foaming behaviour of the above-mentioned sizing agents.

The foaming which occurs in the sizing liquid and on the size press has an adverse effect upon the paper manufacturing process. The particles of foam thrown out by the size press may cause specks in the paper and, in some cases, may even result in tearing of the paper web with the result that production might have to be interrupted.

SUMMARY OF THE INVENTION

Accordingly, the present invention relates to surface sizing agents for paper which, when used in the size press of a paper machine, show very little, if any, tendency towards foaming and which, in addition, have excellent sizing properties. It has been found that sizing agents of the type in question may be obtained by reacting copolymers of maleic acid anhydride and diisobutylene or corresponding terpolymers with other vinyl monomers with suitable amines to form semi-amides and converting the resulting semi-amides into the corresponding aqueous or aqueous-alcoholic alkali metal, amine or ammonium salt solutions.

DETAILED DESCRIPTION OF THE INVENTION

More particularly, the present invention relates to low-foam surface sizing agents for paper in the form of aqueous or aqueous-alcoholic alkali metal, amine or ammonium salt solutions of copolymers containing carboxylic acid semi-amide groups, which in turn may be obtained by reacting copolymers of maleic acid anhydride and diisobutylene and/or terpolymers of maleic acid anhydride, diisobutylene and vinyl monomer copolymerising with maleic acid anhydride corresponding to above general formula (1), with from 5 to 50 mole percent, preferably from 15 to 40 mole percent, based on maleic acid anhydride groups, of a primary aliphatic or aromatic monoamine.

Vinyl monomers corresponding to above general formula (1) suitable for producing the terpolymers are, for example isobutylene, styrene, α-methyl styrene, allyl alcohol, methallyl alcohol and isobutyl vinyl ether.

Compared with the paper sizing agents known from German Offenlegungsschrift Nos. 2,361,544; 2,501,123 and 2,701,760, the surface sizing agents according to the present invention show a lesser tendency towards foaming, if any, and in addition have a wider scope of application, depending on the types of paper to be sized. While the above-mentioned sizing agents are preferably used for unsized and pre-sized papers containing aluminium ions, generally in the form of alum, the surface sizing agent according to the present invention also has a very good sizing effect on papers which do not contain any aluminium ions. This behaviour is particularly important because the surface sizing agent according to the present invention may also be used for sizing papers containing chalk as filler because, in this case sizing is generally carried out at pH values of about 7 and in the absence of alum.

Anionic surface sizing agents are normally used in practice for alum-containing papers, whilst cationic surface sizing agents are normally used for alum-free papers and for papers containing chalk as filler. By virtue of its particular characteristics, the product according to the present invention may be used both as an anionic and as a cationic sizing agent. In contrast to cationic products, it has the additional advantage that it does not reduce the effectiveness of optical brighteners present in the paper.

Examples of the amines which may be used in accordance with the present invention are methylamine, ethylamine, n-propylamine, isopropylamine, n-butylamine, isobutylamine, n-pentylamine, n-hexylamine, n-heptylamine, n-octylamine, cyclohexylamine and aniline. It is preferred to use the unbranched aliphatic amines, particularly, those containing from 2 to 6 carbon atoms. However, mixtures of these amines may also be used. The reaction of the copolymers of maleic acid anhydride and diisobutylene or the terpolymers of maleic acid anhydride, diisobutylene and a vinyl monomer with the monoamines is carried out in solvents, such as benzene, toluene, xylene, acetone, methyl ethyl ketone, dimethyl formamide, tetrahydrofuran and dioxane. Mixtures of these solvents may also be used. The temperature at which this semi-amidation is carried out may be from 20° to 120° C., preferably from 30° to 100° C. The reaction time amounts to from 1 to 24 hours, preferably from 2 to 8 hours. It is, of course, also possible directly to copolymerize diisobutylene with the corresponding maleic acid semi-amides to form the corresponding copolymers under the conditions normally used for copolymerizing diisobutylene with maleic acid anhydride.

Since, in the described processes, only some of the maleic acid anhydride units of the copolymer are amidated, other maleic acid anhydride groups are accessible to a reaction with monohydric alcohols to form semi-esters. Such products may also be used with advantage in the form of the alkali metal, ammonium or amine salts as anionic paper sizing agents in the acid and neutral range. Linear or branched aliphatic monohydric alcohols containing from 1 to 20 carbon atoms are suitable for producing the semi-esters. From 10 to 100 mole percent of the anhydride groups still present in the copolymers after semi-amidation may be reacted to form the corresponding semi-esters.

In a preferred embodiment of the present invention the sizing agents are applied in aqueous solution in combination with urea or derivatives of urea. Suitable derivatives of urea are those wherein one or both nitrogen atoms are substituted by $C_1$–$C_4$ alkyl groups or $C_1$–$C_4$ hydroxyalkyl groups such as hydroxymethyl groups. Dimethyl urea, tetramethyl urea and dimethylol urea are mentioned as examples. Urea and the derivatives of urea, respectively, are generally added in an amount of 10 to 200% by weight and preferably of 20 to 100% by weight, based on the semi-amide/semi-ammonium salts of the partially amidated copolymers or terpolymers of maleic acid anhydride and diisobutylene.

By the addition of urea and derivatives of urea the amount of polymer can be reduced without impairing the excellent sizing properties, which are only achieved with higher amounts of polymer if no urea is added. Moreover, the sizing agents obtained by combination with urea and derivatives of urea meet in an extremely good manner the practical requirements to surface sizing agents for paper concerning low viscosity of the solution and little tendency towards foaming.

Both the afore-mentioned semi-amide/semi-ammonium salts of maleic acid anhydride/diisobutylene copolymers and terpolymers as well as the above-mentioned semi-amide/semi-ammonium salts wherein additionally the maleic acid anhydride units have been partially esterified with monohydric alcohols are suitable for the combination with urea and derivatives of urea. Linear or branched aliphatic monohydric alcohols containing from 1 to 20 carbon atoms are suitable for producing the semi-esters. From 10 to 100 mole percent of the anhydride groups still present in the polymers after semi-amidation may be reacted to form the corresponding semi-esters. These products, too, are anionic sizing agents having an extremely little tendency towards foaming which can be used in the acid and neutral pH-range.

By the addition of urea and derivatives of urea to the polymer solutions the concentration of these polymers in the aqueous solutions of the sizing agent can be distinctly reduced while the same sizing effect is obtained which otherwise is only achieved at considerably higher concentrations, if the polymers are used alone. Accordingly, the addition of urea permits to distinctly reduce the amount of, e.g., semi-amide/semi-ammonium salt of amidated copolymer of maleic acid anhydride and diisobutylene in the solution of the sizing agent without impairing the outstanding sizing qualities of the product.

The surface sizing agents for paper according to the present invention may be used in the processing methods normally used for surface sizing in the manufacture of paper. The sizing agents may be used both on their own and also in combination with dispersions of plastics. In addition, the minimal tendency thereof towards foaming is not affected either by unfavourable size press constructions or by the hardness of the water used. The products may be used either on their own or in combination with sizing agents added to the pulp for surface sizing most of the conventional types of paper, such as alum-containing papers, alum-free papers, papers filled with kaolin, papers filled with chalk, neutral papers, acid papers, unsized papers, pre-sized papers, papers containing wood, and papers containing old paper.

In the following Examples, the percentages quoted always represent percent by weight.

EXAMPLE 1

Production of surface sizing agent 1:

392 g (4.0 mole) of maleic acid anhydride and 500 g of xylene are introduced into a three-liter stirrer-equipped vessel provided with a reflux condenser, an internal thermometer, a nitrogen inlet and two dropping funnels. 640 g (5.7 moles) of diisobutylene (technical mixture of 2,4,4-trimethyl-1-pentene and 2,4,4-trimethyl-2- pentene) and 12.54 g (0.076 mole) of azo-bis-isobutyronitrile (AIBN) in 400 g of xylene are then simultaneously introduced under nitrogen over a period of from 3 to 4 hours at 100° C. On completion of the addition, 24 g (0.43 mole) of isobutylene are introduced into the reaction mixture over a period of 15 minutes and, at the same time, 3.76 g (0.017 mole) of t-butyl per 2-ethyl hexanoate in 30 g of xylene are added dropwise, followed by stirring for 5 hours at 100° C. 92.68 g (1.54 mole) of isopropanol are then added, followed by cooling, with stirring, to 60° C. over a period of 1 hour. 109.8 g (1.50 mole) of n-butylamine are then added over a period of 30 minutes and reacted with the anhydride groups of the polymer present in the reaction mixture over a period of 12 hours at a temperature of 80° C.

By continuously introducing the polymer solution formed into water at 90° C. and distilling off the solvent and the non-copolymerising 2,4,4-trimethyl-2-pentene in vacuo, the polymer is precipitated in the form of a fine white powder. After residual xylene and diisobutylene have been removed by applying a vacuum of from 150 to 200 mm Hg for about 2 hours, the polymer is dissolved by addition of 25% aqueous ammonia solution and freed from the last traces of solvent and monomer by degassing under a vacuum of from 150 to 30 mm Hg at a temperature of 50° C. The solution is diluted with water to a solids content of about 19%, by weight. This solution is eminently suitable for the surface sizing of paper, as demonstrated by the following application Examples.

EXAMPLE 2

Production of surface sizing agent 2:

In a 40-liter steel autoclave, 10,080 g (48.0 moles) of an alternating copolymer of maleic acid anhydride and diisobutylene are dissolved in 13,380 g of methyl ethyl ketone at room temperature. A solution of 1063 g (14.56 moles) of n-butylamine and 300 g (5 moles) of isopropanol in 800 g of methyl ethyl ketone is then introduced over a period of 2 hours, again at room temperature. After the amine has been added, the reaction mixture is heated to 60° C. and stirred for 4 hours at that temperature. This copolymer solution is stripped by introduction in vacuo into a 100-liter precipitation vessel containing 60 liters of water at from 50° to 60° C. and simultaneously distilling off the solvent, resulting in the formation of a finely divided aqueous suspension of the polymer. By adding 6750 g of a 25% aqueous ammonia solution, the copolymer suspension is converted into an aqueous solution which is subsequently freed from the last traces of solvent by applying a vacuum of from 180 to 30 mm Hg at a temperature of 50° C. The solution is diluted with water to a solids content of 19%, by weight. The thus-prepared aqueous copolymer solution is used as a surface sizing agent for paper.

APPLICATION EXAMPLE 1

This Example is intended to demonstrate the good sizing effect of the surface sizing agent described in Production Example 1 on papers of different composition. The Cobb value (according to DIN 53 132) was determined as a measure of the sizing effect.

The papers used had the following composition:

(a) Alum-free paper:

50% of softwood cellulose, 50% of hardwood cellulose, 9.5% of clay ash, pH of the pulp: 7.5; wet absorption in a laboratory sizing press: approximately 85%; paper weight: 80 g/m²

(b) Alum-containing paper:

50% of softwood cellulose, 50% of hardwood cellulose, 1% of alum, 11.2% of clay ash, pH of the pulp: 4.4; wet absorption: approximately 80%; paper weight: 80 g/m².

(c) Pre-sized paper:

50% of softwood cellulose, 50% of hardwood cellulose, 1% of alum, 0.1% of Bewoid size, 11.1% of clay ash, pH of the pulp: 4.5; wet absorption: approximately 80%; paper weight: 80 g/m².

(d) Chalk-containing paper:

50% of softwood cellulose, 50% of hardwood cellulose, 7.9% of chalk ash. pH of the pulp: 7.5; wet absorption: approximately 90%; paper weight: 75 g/m².

(e) Wood-containing paper:

40% of softwood cellulose, 60% of mechanical wood pulp, 14.1% of clay ash, pH of the pulp: 4.5; wet absorption: approximately 40%; paper weight: 75 g/m².

The papers were sized in a laboratory sizing press of the HF Type manufactured by the Mathis company of Zurich, Switzerland. The sizing liquid used was a solution of 5%, by weight, of commercial starch and from 0.19 to 0.24%, by weight, of the size to be tested (expressed as 100% active substance) in from 94.87 to 94.76%, by weight, of water.

The surface-sized papers were dried for 1 minute at about 100° C. on a drying cylinder. Before the sizes were tested, the papers were conditioned for 2 hours at room temperature.

| Paper | Cobb value in g/m² with addition of | |
|---|---|---|
| | 0.19% of size (100%) to the liquid | 0.24% |
| Alum-free | 24.0 | 22.4 |
| Alum-Containing | 19.7 | 19.1 |
| Pre-sized | 18.5 | 17.4 |
| Chalk-containing | 23.5 | 22.0 |
| Wood-containing | 18.5 | 17.9 |

APPLICATION EXAMPLE 2

This Example is intended to demonstrate the improved sizing effect of the sizing agents according to the present invention on alum-free and chalk-containing papers in relation to the prior art (surface size according to the German Offenlegungsschrift No. 2,361,544). The degree of sizing was determined both by the Cobb value in g/m² and also using the Hercules Sizing Tester. The Hercules Sizing Tester, manufactured by Hercules Inc., Wilmington, Del. U.S.A. records the time in seconds in which remission falls to 75% of the remission value of paper when the test ink is applied to and penetrates through the paper. The test ink used is the green ink manufactured by Hercules.

| | Cobb value in g/m² with addition of 0.19% 0.24% of size (100%) to the liquid. | | Degree of sizing according to Hercules in sec. with addition of 0.19% 0.24% of size (100%) to the liquid | |
|---|---|---|---|---|
| (a) Alum-free paper: | | | | |
| Sizing agent 1 according to the invention | 24.1 | 21.2 | 98 | 220 |
| Sizing agent according to German Offenlegungsschrift No. 2,361,544 | 39.6 | 21.8 | 21 | 125 |

-continued

| | Cobb value in g/m² with addition of 0.19%  0.24% of size (100%) to the liquid. | | Degree of sizing according to Hercules in sec. with addition of 0.19%  0.24% of size (100%) to the liquid | |
|---|---|---|---|---|
| (b) Chalk-containing paper: | | | | |
| Sizing agent 1 according to the present invention | 25.1 | 21.8 | 175 | 236 |
| Sizing agent according to German Offenlegungsschrift No. 2,361,544 | 45.8 | 25.5 | 85 | 203 |

APPLICATION EXAMPLE 3

The foaming behaviour of the sizing agents according to the present invention was tested in a laboratory foaming tester which simulates the conditions prevailing in the size press of a paper machine. In this foaming tester, the sizing liquid which contains the sizing agent to be tested, starch and other additives, if any, is withdrawn under suction at a constant rate from a thermostatically controlled glass beaker through a pipe at the bottom of this glass beaker and returned to the glass beaker through a steel pipe let into the cover of the glass beaker. This steel pipe ends 150 mm above the surface of the liquid so that the sizing liquid impinges directly on the surface in the form of a jet which may give rise to foaming. Accordingly, the volume of foam in ml measured over the surface of the sizing liquid after a certain test period is a measure of the tendency towards foaming of the liquid to be tested.

The following Table provides a synopsis of the foaming behaviour, as determined using the above-mentioned test apparatus, of surface sizes 1 and 2 described in the Production Examples by comparison with the product produced in accordance with German Offenlegungsschrift No. 2,361,544. For this purpose, quantities of 700 ml of an aqueous sizing liquid were prepared, containing 5%, by weight, of a commercial starch and 0.19%, by weight, of the size to be tested. The solutions were heated to 60° C. and pumped through the test apparatus at a rate of 170 liters per hour. The volume of foam in ml building up over the surface of the liquid during the test was measured at intervals of 5 minutes.

| Sizing agent | Foam volume in ml after a test period of | | | | | |
|---|---|---|---|---|---|---|
| | 5 | 10 | 15 | 20 | 25 | 30 minutes |
| Sizing agent according to Example 1 | 100 | 100 | 100 | 100 | 100 | 100 |
| Sizing agent according to Example 2 | 100 | 100 | 100 | 100 | 100 | 100 |
| Sizing agent according to German Offenlegungsschrift No. 2,361,544 | 700 | 800 | 900 | 1000 | 1200 | 1600 |

EXAMPLE 3

Production of surface sizing agent 3:

The production of the polymer is carried out under nitrogen according to the procedure described in Example 1 in a 40 liters autoclave equipped with a stirrer from 4704 g of maleic acid anhydride, 7680 g of diisobutylene, 360 g of isobutylene, 1112 g of isopropanol, and 1095 g of n-butylamine. The resulting polymer solution is continuously introduced into a solution of 6000 g of urea in water at 90° C. and worked up as described in Example 1. By final dilution with water a urea containing solution of the sizing agent is prepared having a total solids content of about 22.5% by weight which is used in application examples 4 to 6.

APPLICATION EXAMPLE 4

The sizing effect on different kinds of paper is determined as described in application example 1.

| Paper | Cobb value in g/m² with addition of | |
|---|---|---|
| | 0.19% | 0.24% |
| | of size (100%) to the liquid | |
| Alum-free | 24.2 | 22.4 |
| Alum-containing | 19.5 | 18.5 |
| Pre-sized | 18.6 | 17.8 |
| Chalk-containing | 23.8 | 22.2 |
| Wood-containing | 19.4 | 18.5 |

APPLICATION EXAMPLE 5

The comparison with the sizing agent according to German Offenlegungsschrift No. 2,361,544 is carried out as described in application example 2.

(a) Alum-free paper:

| | Cobb value in g/m² with addition of 0.19%  0.24% of size (100%) to the liquid. | | Degree of sizing according to Hercules in sec. with addition of 0.19%  0.24% of size (100%) to the liquid. | |
|---|---|---|---|---|
| Sizing agent 3 according to the invention | 23.8 | 21.1 | 99 | 226 |
| Sizing agent according to German Offenlegungsschrift No. 2,361,544 | 39.6 | 21.8 | 21 | 125 |

(b) Chalk-containing paper:

| | Cobb vaulue in g/m² with addition of 0.19%  0.24% of size (100%) to the liquid. | | Degree of sizing according to Hercules in sec. with addition of 0.19%  0.24% of size (100%) to the liquid. | |
|---|---|---|---|---|
| Sizing agent 3 according to the present invention | 24.7 | 21.5 | 181 | 242 |
| Sizing agent according to German Offenlegungsschrift No. 2,361,544 | 45.8 | 25.5 | 85 | 203 |

APPLICATION EXAMPLE 6

The foaming behaviour is tested as described in application example 3. However, the solutions are pumped through the test apparatus at the even higher rate of 200 liters per hour.

TABLE

| Sizing agent | Foam volume in ml after a test period of | | | | | |
|---|---|---|---|---|---|---|
| | 5 | 10 | 15 | 20 | 25 | 30 min. |
| Sizing agent according to Example 3 | 100 | 100 | 100 | 100 | 100 | 100 |

TABLE-continued

| Sizing agent | Foam volume in ml after a test period of | | | | | |
|---|---|---|---|---|---|---|
| | 5 | 10 | 15 | 20 | 25 | 30 min. |
| Sizing agent according to German Offenlegungsschrift No. 2,361,544 | 1000 | 1200 | 1400 | 1700 | 2000 | 2300 |

We claim:

1. Low-foam surface sizing agents for paper in the form of aqueous or aqueous-alcoholic alkali metal, amine or ammonium salt solutions of copolymers containing carboxylic acid semi-amide groups obtainable by reacting substantially equimolar copolymers of maleic acid anhydride and diisobutylene and/or terpolymers of maleic acid anhydride, diisobutylene and a vinyl monomer copolymerizing with maleic acid anhydride, with from 15 to 40 mole percent, based on maleic acid anhydride groups, of n-butyl amine.

2. Sizing agents as claimed in claim 1, wherein the solutions contain from 10 to 200% by weight, based on copolymer and terpolymer, respectively, of urea, alkyl substituted urea or hydroxyalkyl substituted urea.

* * * * *